United States Patent
Acharya et al.

(10) Patent No.: US 11,475,493 B2
(45) Date of Patent: Oct. 18, 2022

(54) METHODS FOR DYNAMICALLY ASSESSING APPLICABILITY OF PRODUCT REGULATION UPDATES TO PRODUCT PROFILES

(71) Applicant: UL LLC, Northbrook, IL (US)

(72) Inventors: Saurav Acharya, Des Plaines, IL (US); Lisa Epstein, Boston, MA (US); Valeriy Liberman, Buffalo Grove, IL (US); Rashid Mehdiyev, Buffalo Grove, IL (US); Annie Ibrahim Rana, Dublin (IE); Spencer Sharpe, Laramie, WY (US); Michael Arnold, Duvall, WA (US)

(73) Assignee: UL LLC, Northbrook, IL (US)

( * ) Notice: Subject to any disclaimer, the term of this patent is extended or adjusted under 35 U.S.C. 154(b) by 0 days.

(21) Appl. No.: 16/710,561

(22) Filed: Dec. 11, 2019

(65) Prior Publication Data
US 2021/0182926 A1    Jun. 17, 2021

(51) Int. Cl.
*G06Q 30/00* (2012.01)
*G06Q 30/06* (2012.01)
*G06N 20/00* (2019.01)

(52) U.S. Cl.
CPC ......... *G06Q 30/0607* (2013.01); *G06N 20/00* (2019.01); *G06Q 30/0627* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,745,146 B1 | 6/2004 | Brown et al. | |
| 7,124,101 B1 | 10/2006 | Mikurak | |

(Continued)

FOREIGN PATENT DOCUMENTS

| | | |
|---|---|---|
| BE | 1025215 B1 | 12/2018 |
| BE | 1025240 B1 | 12/2018 |

(Continued)

OTHER PUBLICATIONS

No Author, "How AI and machine learning are revolutionizing quality control" Retrieved from https://www.ingedata.net/blog/artificial-intelligence-and-quality-control (Year: 2018).*

(Continued)

*Primary Examiner* — Naeem U Haq
(74) *Attorney, Agent, or Firm* — Marshall, Gerstein & Borun LLP

(57) ABSTRACT

Systems and methods for dynamically determining potentially applicability of product regulation updates to product profiles. According to certain aspects, an electronic device may access new or updated product regulation updates for various jurisdictions as well as product profiles associated with certain products. The electronic device may employ various data analysis technologies to determine which product regulation updates are potentially applicable to which product profiles. The electronic device may present information associated with the data analyses, and enable users to review information, further assess applicability, make selections, and interface and integrate with external systems to exchange information and insights.

17 Claims, 13 Drawing Sheets

(56) References Cited

U.S. PATENT DOCUMENTS

| | | | |
|---|---|---|---|
| 9,367,851 | B2 | 6/2016 | Dale et al. |
| 9,779,178 | B2 | 10/2017 | Ghent |
| 9,799,006 | B2 | 10/2017 | Daulton et al. |
| 9,959,367 | B2 | 5/2018 | Ghent |
| 10,248,981 | B1* | 4/2019 | Dallas ............ G03B 15/06 |
| 10,685,310 | B1 | 6/2020 | McCuiston et al. |
| 10,861,070 | B2* | 12/2020 | Dika ............ G06Q 30/0607 |
| 10,867,268 | B1 | 12/2020 | Kumar et al. |
| 10,872,206 | B2 | 12/2020 | Snyder et al. |
| 10,962,965 | B2 | 3/2021 | Cahill |
| 2002/0059093 | A1 | 5/2002 | Barton et al. |
| 2004/0139053 | A1* | 7/2004 | Haunschild ............ G06Q 10/10 |
| 2004/0177326 | A1 | 9/2004 | Bibko et al. |
| 2005/0182695 | A1 | 8/2005 | Lubow et al. |
| 2006/0178905 | A1 | 8/2006 | Ayers et al. |
| 2008/0040390 | A1* | 2/2008 | Oves ............ G16C 20/90 |
| 2008/0222631 | A1 | 9/2008 | Bhatia et al. |
| 2008/0281768 | A1 | 11/2008 | Sadeh |
| 2008/0313070 | A1 | 12/2008 | Fell et al. |
| 2010/0205208 | A1 | 8/2010 | Walker |
| 2011/0208662 | A1 | 8/2011 | Haunschild |
| 2011/0302171 | A1 | 12/2011 | Waldo et al. |
| 2012/0158446 | A1 | 6/2012 | Mayerle et al. |
| 2012/0323806 | A1* | 12/2012 | Abrams ............ G06Q 10/063 705/317 |
| 2013/0262484 | A1* | 10/2013 | Kamat ............ G06Q 10/10 707/754 |
| 2014/0074513 | A1 | 3/2014 | Bhatt et al. |
| 2014/0337209 | A1 | 11/2014 | Maiya et al. |
| 2015/0019541 | A1* | 1/2015 | Carus ............ G06F 16/367 707/723 |
| 2015/0112813 | A1 | 4/2015 | Cauthen |
| 2016/0092885 | A1* | 3/2016 | Creager ............ G06Q 30/0635 705/317 |
| 2016/0350885 | A1 | 12/2016 | Clark |
| 2017/0098257 | A1 | 4/2017 | Keller |
| 2017/0249642 | A1 | 8/2017 | Burpulis et al. |
| 2017/0249644 | A1 | 8/2017 | DiMaggio et al. |
| 2017/0249685 | A1 | 8/2017 | Villa |
| 2017/0286880 | A1 | 10/2017 | Wiig et al. |
| 2017/0330121 | A1 | 11/2017 | Sullivan et al. |
| 2018/0046972 | A1 | 2/2018 | Sheth et al. |
| 2018/0075554 | A1 | 3/2018 | Clark |
| 2018/0130050 | A1 | 5/2018 | Taylor et al. |
| 2018/0260820 | A1 | 9/2018 | Keating et al. |
| 2018/0330455 | A1 | 11/2018 | Bayyapu et al. |
| 2019/0147456 | A1 | 5/2019 | Hermans |
| 2019/0172073 | A1 | 6/2019 | Wiig et al. |
| 2020/0175110 | A1 | 6/2020 | Snyder et al. |
| 2020/0357000 | A1 | 11/2020 | Levine et al. |
| 2020/0372557 | A1* | 11/2020 | Peters ............ G06Q 10/0832 |
| 2021/0165400 | A1 | 6/2021 | Cahill |
| 2021/0174277 | A1 | 6/2021 | Kumar et al. |
| 2021/0312470 | A1 | 10/2021 | Barlin |

FOREIGN PATENT DOCUMENTS

| | | |
|---|---|---|
| BE | 1025247 B1 | 12/2018 |
| BR | 112020014980 A2 | 12/2020 |
| CN | 110223030 A | 9/2019 |
| CN | 110310010 A | 10/2019 |
| CN | 110659818 A | 1/2020 |
| CN | 110659875 A | 1/2020 |
| CN | 110673828 A | 1/2020 |
| CN | 110737728 A | 1/2020 |
| CN | 111435240 A | 7/2020 |
| CN | 111465952 A | 7/2020 |
| CN | 112513901 A | 3/2021 |
| DE | 102020100874 A1 | 7/2020 |
| GB | 2586294 A | 2/2021 |
| JP | 2020113280 A | 7/2020 |
| JP | 7041963 B2 | 3/2022 |
| KR | 101720730 B1 | 3/2017 |
| TW | 202032442 A | 9/2020 |
| WO | WO-2019156773 A1 | 8/2019 |
| WO | WO-2020009670 A1 | 1/2020 |

OTHER PUBLICATIONS

Landauer, T. K., Foltz, P. W., & Laham, D. "Introduction to Latent Semantic Analysis" Discourse Processes, 25, 259-284 (1998). (Year: 1998).*

Tanesh Balodi "Introduction of Latent Semantic Analysis (LSA) and Latent Dirichlet Allocation (LDA)" Oct. 22, 2019. Retrieved from https://www.analyticssteps.com/blogs/introduction-latent-semantic-analysis-lsa-and-latent-dirichlet-allocation-lda (Year: 2019).*

Prateek Joshi "Text Mining 101: A Stepwise Introduction to Topic Modeling using Latent Semantic Analysis (using Python)" Oct. 1, 2018. Retrieved from https://medium.com/analytics-vidhya/text-mining-101-a-stepwise-introduction-to-topic-modeling-using-latent-semantic-analysis-using-add9c905efd9 (Year: 2018).*

No Author "Knowledge Graph" IBM Cloud Education, Apr. 12, 2021. Retrieved from https://www.ibm.com/cloud/learn/knowledge-graph (Year: 2021).* fdaatty.com, "FDA Atty, Food, Dietary Supplement, Medical Device Attorneys" (2015-2018). Retrieved from the Internet on Sep. 13, 2019: https://fdaatty.com/.

fda.gov, "Medical Device Safety, FDA" (Sep. 12, 2019). Retrieved from the Internet on Sep. 13, 2019: https://www.fda.gov/medical-devices/medical-device-safety.

oehha.ca.gov, "OEHHA, California Office of Environmental Health Hazard Assessment, Environmental Topics About Proposition 65," (Jun. 28, 2019). Retrieved from the Internet on Sep. 13, 2019: https://oehha.ca.gov/proposition-65.

Kensaq.com, "KensaQ Search," (2019) Ask Media Group, LLC. Retrieved from the Internet on Sep. 13, 2019: https://www.kensaq.com/web?qo=semQuery&ad=semA&q=california%20prop%2065&o=766195&ag=fw5&an=msn_s&rch=intl1437.

repositrak.com, "ReposiTrak The Speed Retail Platform Proposition 65: What Is It and What's Changing?" (Sep. 2019). Retrieved from the Internet on Sep. 13, 2019: https://repositrak.com/blog/proposition-65-what-is-it-and-whats-changing/?gclid=Cj0KCQjw2efrBRD3ARIsAE0egmXtXuEvSooE-jqKpAP3Xh6aKtvPVEWJMEr0nf6pslSgP1RJI44LkaArszEALw_wcB.

assentcompliance.com, "Assent, Whitepaper Proposition 65: Understanding the Safe Drinking Water & Toxic Enforcement Act" (2019) Assent Compliance Inc. Retrieved from the Internet on Sep. 13, 2019: https://www.assentcompliance.com/assentu/resources/whitepaper/proposition-65-safe-drinking-water-and-toxic-enforcement-act/?sem_account_id=B041T1BB&sem_campaign_id=328794695&sem_ad_group_id=126339224318963&sem_device_type=c&sem_keyword=california%20prop%2065&sem_matchtype=e&sem_ad_id=creative&sem_network=o&sem_target_id=kwd-78958985308717:loc-190&sem_feed_item_id=&utm_source=bing&utm_medium=cpc&utm_term=california%20prop%2065&sem_location_id=102956&sem_placement=placement&sem_placement_category=target&utm_campaign=TS:TX:NBR:US:REG:X:CA:Prop65:X:X&msclkid=1c28da84837c19f3a18c87fe238eadd8&utm_content=TS%3ATX%3ANBR%3AUS%3AREG%3AX%3AX%3AX%3ACAProp65%3AX%3AX%3AX%3AX.

* cited by examiner

Profile Dashboard iON

Menu
- Home
- COMPLAINT
- PROFILE
  - Dashboard
  - Management
  - Regulations
- Help & Support
- Hide
- Powered by UL PROFILE ▸ | Search 🔍

🏢 DemoCompany

202 Top 5 Category by Impact
- ■ 5 PL_HEA...
- ▨ 5 PL_Cons...
- ▨ 4 PL_Cons...
- ▨ 4 PL_WIRE...
- ▨ 4 PL_TV_A...

203 Top 5 Requirements by Impact
- 1 PL_CE_GENERAL...
- 1 PL_CONSUMER_...
- 1 PL_Consumer_H...
- 1 PL_CHRISTMAS_...
- 1 PL_HEADPHONE.

204 Rated/Non-rated Impacts
- ■ Rated 0
- ▨ Non-Rated 3

Most Recent 201

> 📍 California — California (USA): Appliance Efficiency Regulations, 20 CCR 1601-1609, 2016
  Effective Date 2015-07-01    Alert Date 2018-12-05

> 📍 Japan — Japan: Radio Act Enforcement Regulations, Ordinance No. 14, 1950
  Effective Date 1950-12-01    Alert Date 2018-12-01

> 📍 India — India: Energy Efficiency Labeling of Household Frost Free Refrigerators, Regulations, July 2009 - Am..
  Effective Date 2013-05-09    Alert Date 2018-11-24

FIG. 2B iON — Profile Dashboard — Profile ▾ | Search 🔍 — 🛒 DemoCompany ⓜ

210

‹ ≡ Menu

⌂ Home

COMPLAINT ›

PROFILE ›
📊 Dashboard
🗔 Management
⌘ Regulations
Help & Support ›

‹ Hide

Powered by ⓤ

≡ Filter ▾ | 📅 Select date range ▾ | Country ▾ | Products Covered ▾ | Clear 211    212    213

Selection

Regulation impact summary (16)       Sort By [ Alert Date ▾ ]

214

205
› California (USA): Appliance Efficiency Regulations, 20 CCR 1601-1609, 2016  📌  California   Effective Date 07/01/2015   Alert Date 12/05/2018

› Japan: Radio Act Enforcement Regulations, Ordinance No. 14, 1950  📌  Japan   Effective Date 12/01/1950   Alert Date 12/01/2018

› India: Energy Efficiency Labeling of Household Frost Free Refrigerators, Regulations, July 2009 - Am...  📌  India   Effective Date 05/09/2013   Alert Date 11/24/2018

› Japan: Ratio Act Enforcement Ordinance, Cabinet Order No. 245, 2001  📌  India   Effective Date 07/25/2001   Alert Date 11/23/2018

Profile Dashboard                              🛒 DemoCompany (m)

221 —
▸ California (USA): Appliance Efficiency Regulations, 20 CCR 1601-1609, 2016 🔔 California | Effective Date 2015-07-01 | Alert Date 2018-12-05 ⬅ 223

SUMMARY

MY IMPACTED PROFILES (35)

📌 California (USA): Appliance Efficiency Regulations, 20 CCR 1601-1609, 2016

The Appliance Efficiency Regulations include standards for both federally regulated appliances and nonfederally-regulated appliances. Twenty-three categories of appliances are included in the scope of these regulations. The standards within these regulations apply to appliances that are sold or offered for sale in California, except those sold wholesale in California for final retail sale outside the state, and those designed and sold exclusively for use in recreational vehicles or other mobile equipment.

The current *Appliance Efficiency Regulations* (California Code of Regulations, Title 20, Sections 1601 through 1609), dated January 2017, contain amendments that were incorporated due to new standards for state-regulated appliances that were approved by the Office of Administrative Law through December 31, 2016, and replace all previous versions. The official version of these regulations is published by the Office of Administrative Law.

[ Regulation Source 🔗 ]  — 222

| | 224 |
|---|---|
| PL_Audio_Visual_Cables | |
| PL_Extension_Power_Cords | |
| PL_Consumer_Vacuum_Cleaners | |
| PL_Consumer_Power_Adaptors | |
| PL_Consumer_Power_Refrigerators | |
| PL_Consumer_Power_Water_Heaters | |
| PL_LIGHTBULBS | |
| PL_Automotive_Power_Adaptors | |

Sidebar:
- ✴ iON
- ☰ Menu
- 🏠 Home
- COMPLAINT ⌄
- PROFILE
  - 📊 Dashboard
  - 💬 Management
  - ⚖ Regulations
- Help & Support ⌄
- ‹ Hide
- Powered by (UL)

Profile Dashboard

230

| | |
|---|---|
| Menu | |
| ⌂ Home | |
| COMPLAINT ˅ | |
| PROFILE ˅ | |
| ▦ Dashboard | |
| ▢ Management | |
| ⌁ Regulations | |
| Help & Support ˅ | |
| ˅ Hide | |
| Powered by (UL) | |

PROFILE ▾ | Search 🔍

🏛 DemoCompany (m)

PL_Audio_Visual_Cables

| ID | REVISION # | COUNTRY/REGION |
|---|---|---|
| PL_Audio_Visual_Cables_United States | 1 | United States |
| PROVIDER | INITIAL PROFILE DATE | PRODUCT |
| UL | 5/5/18 | PL_Audio_Visual_Cables |

Show more ˅

| 7 | 1 | 6 |
|---|---|---|
| REQUIREMENTS | Impact Alerts | Revisions |

Impacts Alerts

Review and rate for accuracy the following the regulation alerts that are impacting your profile

205 ⎯⎯

> Consumer Product Safety Act     California (USA): Appliance Efficiency Regulations...     Effective Date 07/01/2015     Alert Date 12/05/2018     ☆ ☆ ☆ } 231

First | Previous | 1 | Next | Last

*iON*

Menu | Profile Dashboard | PROFILE ▾ Search 🔍 | 🛒 DemoCompany (m)

Home

COMPLAINT ›

PROFILE ›
- Dashboard
- Management
- Regulations

Help & Support ›

‹ Hide

Powered by (UL)

PL_CONSUMER_HAIR_CLIPPERS

ID: PL_CONSUMER_HAIR_CLIPPERS_United States
PROVIDER: UL

REVISION #: 1
INITIAL PROFILE DATE: 5/5/18

Show more ˅

COUNTRY/REGION: United States
PRODUCT: PL_CONSUMER_HAIR_CLIPPERS

14 REQUIREMENTS

⊖1 Impact Alerts

1 Revisions

Impacts Alerts
Review and rate for accuracy the following the regulation alerts that are impacting your profiles. ⓘ

> Consumer Product Safety Act   California (USA): Appliance Efficiency Regulations...   Effective Date 07/01/2015   Alert Date 12/05/2018   ☆☆☆ — 342

341

First | Previous | 1 | Next | Last

Regulation Update Dashboard — 350

Menu: Home | COMPLAINT > | PROFILE: Dashboard, Management, Regulations > | Help & Support > | Hide | Powered by UL PROFILE ▼ | Search 🔍    🏪 DemoCompany (m)

Potentially Applicable Regulation Updates — 351

| protocol.productName | protocol.productDescription | protocol.country | ... | Relevance Score | Profile ID |
|---|---|---|---|---|---|
| Change Table 1_BP1876 | Changing Table 1_BP1876 | United States | | 93 | 1 |
| Change Table 1_BP1876 | Changing Table 1_BP1876 | United States | | 80 | 2 |
| Change Table 1_BP1876 | Changing Table 1_BP1876 | United States | | 56 | 3 |

(354, 353)

Potentially Impacted Product Profiles — 352

| testMethod.requirementOrLimits | testMethod.productScope | ... | testMethod.requirementTitle | testM... |
|---|---|---|---|---|
| No person shall knowingly distribute, sell or... | A new chapter 433 is hereby added to the laws... | | Toxic Chemicals in Children's Products | |
| Except as otherwise provided in section 1609... | This bill prohibits a person selling or o... | | Prohibition of Flame-retardant Chemicals in Fu... | |
| Children\u2019s products containining lead; lead... | To establish consumer product safety standards... | | General Conformity Certification | |
| (a)Beginning on July 1, 2019, halogen Flame Retardant i... | Restriction of Organ no manufacturer... | | Restriction of Organ halogen Flame Retardant i... | |
| Lead Limits For Children's Products\"The Stat... | This act establishes limits for lead in childr... | | An Act Concerning Child Product Safety | |

FIG. 3F

METHODS FOR DYNAMICALLY ASSESSING APPLICABILITY OF PRODUCT REGULATION UPDATES TO PRODUCT PROFILES

FIELD

The present disclosure is directed to dynamically assessing applicability of product regulation updates to product profiles associated with items such as consumer products. More particularly, the present disclosure is directed to platforms and technologies for using various data analysis techniques to determine how products may be affected by applicable regulation updates based on specified product profiles.

BACKGROUND

The amount and scope of consumer products available for sale in the marketplace is constantly changing as new products are introduced and existing products are improved or modified. In particular, product manufacturers, distributors, and the like will consistently release new products and update existing products to meet consumer demand and to compete with other manufacturers, distributors, and the like. Generally, a product is specified according to a product profile which defines or describes the product, features thereof, compliance requirements, brand claims, and/or other aspects, and serves to describe the differentiators of the product.

The introduction and sale of products into the marketplace is subject to governance in the form of regulations, laws, and standards. Typically, different jurisdictions (e.g., federal, state, county, etc.) have different regulations for different products. For example, California may regulate lithium-ion batteries differently than Texas. However, in addition to detailing different requirements, regulations are often not consistent in terminology, scope, or applicability, among other inconsistencies. Additionally, product profiles are not consistent in breadth and terminology, among other inconsistencies. Therefore, entities associated with products (e.g., retailers, manufactures, suppliers, etc.) are not able to effectively determine which regulations may be applicable for certain products, especially new or updated products.

Additionally, there may be a long lead time between the product profile being defined and the product being manufactured and delivered, during which existing regulations may be modified, updated, and/or new regulations introduced. Any such modification or update to product regulations determined to be applicable for certain products may impact their corresponding applicability for those products, and/or may cause those product regulations to be applicable to an entirely new product(s). Moreover, for products already introduced in the marketplace, such regulation updates may have significant impacts by changing the applicable regulations and causing manufacturers to re-evaluate, and possibly update, product profiles despite satisfying all formerly-applicable regulations.

Accordingly, there is an opportunity for platforms and technologies that effectively and efficiently determine applicability of regulation updates to products.

SUMMARY

In an embodiment, a computer-implemented method for dynamically determining potential impacts of product regulation updates on product profiles is provided. The method may include: accessing, by a processor, a set of product regulation update alerts; extracting, by the processor, a set of product regulation updates from the set of product regulation update alerts; storing, in memory, the set of product regulation updates; accessing, by the processor, a set of product profiles associated with a set of products for a given market(s), wherein each product profile of the set of product profiles comprises content descriptive of a corresponding product of the set of products; analyzing, by the processor for each product profile of the set of product profiles, the content descriptive of the corresponding product to determine whether at least one product regulation update of the set of product regulation updates is potentially applicable to the product profile; and displaying, in a user interface, a result of the analyzing.

In another embodiment, a system for dynamically determining impacts of product regulation updates on product profiles is provided. The system may include a memory storing instructions; a user interface; and a processor interfaced with the memory and the user interface. The processor may be configured to execute the instructions to cause the processor to: access a set of product regulation update alerts, extract a set of product regulation updates from the set of product regulation update alerts, cause the memory to store the set of product regulation updates, access a set of product profiles associated with a set of products for a given market(s), wherein each product profile of the set of product profiles comprises content descriptive of a corresponding product of the set of products for a given market(s), analyze, for each product profile of the set of product profiles, the content descriptive of the corresponding product to determine whether at least one product regulation update of the set of product regulation updates is potentially applicable to the product profile, and cause the user interface to display a result of the analyzing.

In a further embodiment, a non-transitory computer-readable storage medium having stored thereon a set of instructions, executable by a processor, for dynamically determining impacts of product regulation updates on product profiles is provided. The instructions may include: instructions for accessing a set of product regulation update alerts; instructions for extracting a set of product regulation updates from the set of product regulation update alerts; instructions for storing, in memory, the set of product regulation updates; instructions for accessing a set of product profiles associated with a set of products for a given market(s), wherein each product profile of the set of product profiles comprises content descriptive of a corresponding product of the set of products for a given market(s); instructions for analyzing, for each product profile of the set of product profiles, the content descriptive of the corresponding product to determine whether at least one product regulation update of the set of product regulation updates is potentially applicable to the product profile; and instructions for displaying, in a user interface, a result of the analyzing.

BRIEF DESCRIPTION OF THE FIGURES

FIGS. 2A-2D depict example interfaces associated with reviewing product profiles and product regulation updates, in accordance with some embodiments.

FIGS. 3A-3F depict example interfaces associated with reviewing product profiles and product regulation updates, in accordance with some embodiments.

DETAILED DESCRIPTION

Figure 1A:
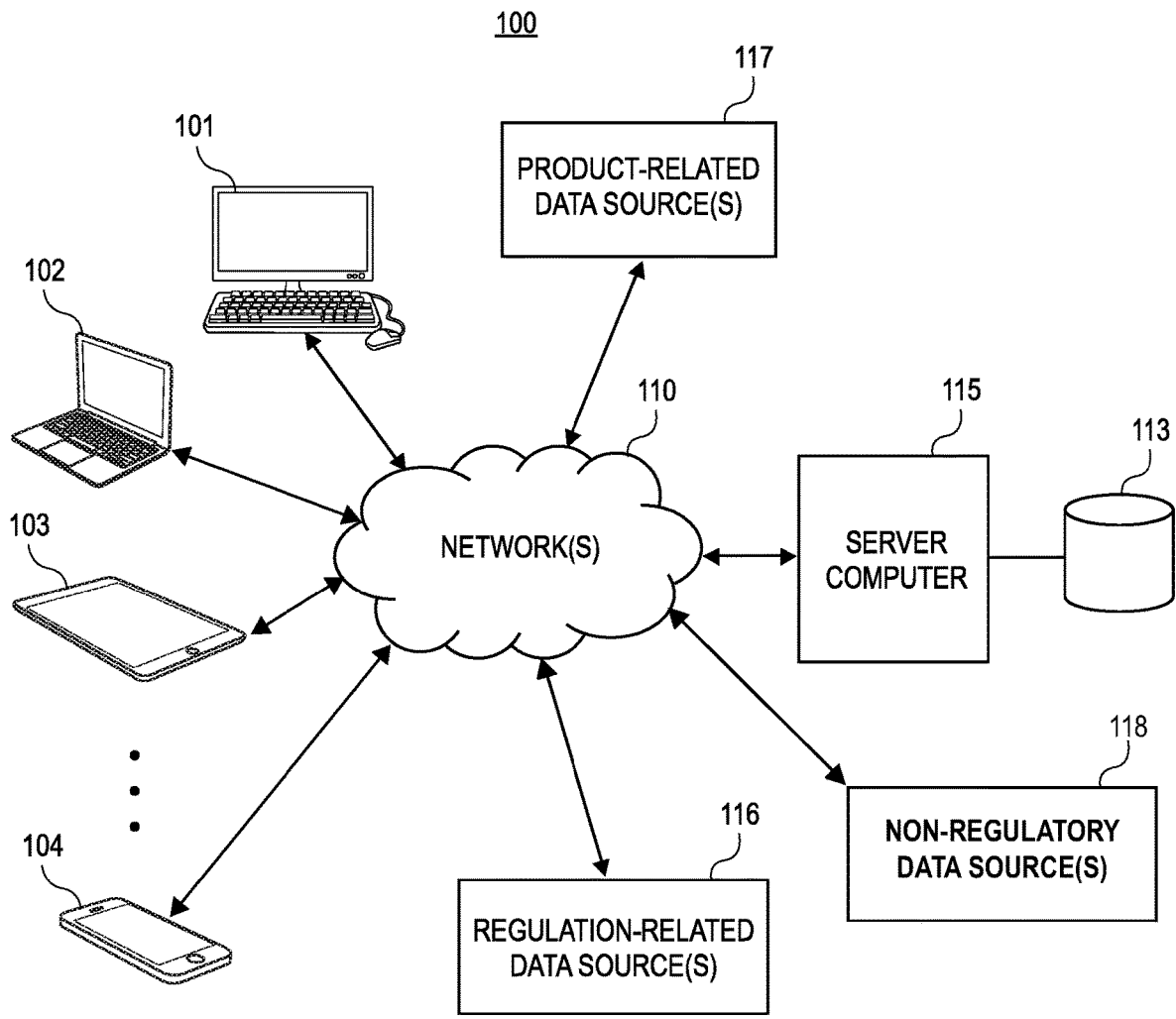
FIG. 1A depicts an overview of components and entities associated with the systems and methods, in accordance with some embodiments.

The present embodiments may relate to, inter alia, platforms and technologies for dynamically assessing applicability of product regulation updates to product profiles. According to certain aspects, systems and methods may receive or otherwise access information indicative of product regulation updates, and may organize and store the information as part of a machine learning model or other data organization structure. The systems and methods may additionally receive or access information indicative of product profiles, such as descriptions of products that are in the marketplace or are being proposed for entry into the marketplace.

The systems and methods may analyze the information indicative of the product profiles, with reference to the product regulation update information, to determine which regulations may be applicable to the associated products. The systems and methods may analyze the information using any stored data model(s) or according to other data analysis techniques. The systems and methods may present information that indicates the potentially applicable regulation updates from a regulatory feed and their potential applicability to certain products for review, selection, and/or correction by certain users. In embodiments, the interaction with the presented information by the users may be captured and input into the machine learning model to increase the accuracy of subsequent regulation update assessments and determinations. Additionally, the feedback from users may be used to assess the quality of the regulatory update assessments, thus enabling contextualization to the target environment, marketplace, or audience.

The systems and methods therefore offer numerous benefits. In particular, the use of various data analyses such as machine learning techniques enable the systems and methods to accurately and dynamically assess regulation update applicability to products. Additionally, entities such as companies and corporations associated with a product lifecycle are afforded the benefit of being able to review regulation updates that are potentially applicable to products that the entities intend to release or introduce. Accordingly, the entities may make necessary adjustments or modifications to the products or to the release/introductions of the products, to comply with the applicable regulation updates. Additionally, consumers would benefit from products that comply with current and proposed regulations and that experience a reduced amount of product recalls. It should be appreciated that additional benefits are envisioned.

The systems and methods discussed herein address a challenge that is particular to supply chain management including market access and evaluating in-market performance. In particular, the challenge relates to a difficulty in accurately and effectively assessing which product regulation updates may be applicable to products before or during the introduction of the products to the market, especially because of inconsistencies between and among product profiles and product regulation updates. Conventionally, individuals must manually review product regulation updates to determine the impact to the corresponding regulation and the applicable products. However, these conventional methods are often time consuming, ineffective, and/or expensive due to the inherent complexity of tracking individual regulation updates. Additionally, the individuals may not have access to up-to-date regulatory changes, which can pose particularly significant issues for products currently available in the marketplace. The systems and methods offer improved capabilities to solve these problems by dynamically and accurately assessing regulation update applicability to products based on up-to-date information and machine learning techniques. Further, because the systems and methods employ communication between and among multiple devices, the systems and methods are necessarily rooted in computer technology in order to overcome the noted shortcomings that specifically arise in the realm of supply chain management.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103, 104. Each of the electronic devices 101, 102, 103, 104 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103, 104 may be an electronic device associated with an entity such as a company, business, corporation, or the like (e.g., a server computer or machine).

Each of the electronic devices 101, 102, 103, 104 may be used by any individual or person (generally, a user). According to embodiments, the user may use the respective electronic device 102, 102, 103, 104 to input information associated with a product(s). The product(s) may be offered for sale or otherwise made available for purchase, distribution or use by a business, company, service provider, or the like. Alternatively or additionally, the business, company, service provider, or the like may be contemplating offering the product for sale or purchase. In embodiments, the information may represent an iteration, update, or new version of the product(s).

Generally, the information for each product may be in the form of a product profile that may include a profile scope; defining product characteristic(s); a set of product requirement(s) based on regulations, standards, and in some cases, retailer requirements; acceptable product deliverable(s) based on requirements, and/or other information. The product profile may be prepared or developed before or after a product concept is decided, before or after concept testing is completed, and/or before or after preliminary sales have been forecasted. The product profile may be based on estimates of market and/or consumer need, testing with target market customers and feedback relating thereto, initial sales projections, estimates of advertising and marketing expenditure to launch a product, and/or estimates of production cost, and may include product specifications such as dimensions, component parts or ingredients, assembly or installation information, as well as compliance and performance requirements such as chemical, electrical, flammability and/or other safety requirements, labeling requirements, performance requirements, and/or other information. Additionally, the product profile may include information about usage conditions, ideal applications, ideal environmental conditions of operation, and usage exceptions that restrict the use of a product to certain types of operators or require a special environment in which to operate the product safely. Although the embodiments discuss protocols for products, it should be appreciated that the systems and methods, and functionalities thereof, may extend to services offered by businesses, companies, service providers, or the like.

As an example, a product profile for a child scooter may identify the component parts and materials of the scooter, mechanical safety requirements, necessary labeling requirements, and other requirements per applicable standards and regulations. As an additional example, a product profile for a light bulb with wireless network connection capabilities may identify the electrical requirements, wattage output, supported communication protocols, and component materials.

According to embodiments, each product profile for each product may be manually generated by an individual or user and input into one of the electronic devices 101, 102, 103, 104 (or another electronic device), automatically generated by one of the electronic devices 101, 102, 103, 104 (or another electronic device), or a combination thereof. Further, each product profile may include any textual (i.e., alphanumeric) content, media content (e.g., audio, video, images, etc.), or a combination thereof.

The electronic devices 101, 102, 103, 104 may communicate with a server computer 115 via one or more networks 110. The server computer 115 may be associated with an entity such as a company, business, corporation, or the like, which markets, manufactures, or sells the product, or is otherwise involved in the supply chain of the product. In embodiments, the electronic devices 101, 102, 103, 104 may transmit or communicate, via the network(s) 110, information associated with product profiles to the server computer 115.

In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102, 103 and the server computer 115.

In alternative or additional implementations, the server computer 114 may communicate with one or more product-related data sources 117. According to embodiments, the product-related data sources(s) 117 may alternatively or additionally receive, access, store, and/or maintain various product profiles. Additionally, the product-related data source(s) 117 may be associated with businesses, companies, service providers, or the like, that may have an agreement, partnership, or contract with an entity associated with the server computer 115, and that offer or contemplate offering various products. Generally, when a business, company, service provider, or the like issues a new or updated product profile, the corresponding product-related data source 117 may push or otherwise send the new or updated product profile to the server computer 115, or the server computer 115 may pull or retrieve the new or updated product profile from the corresponding product-related data source 117. Accordingly, the server computer 115 may store the most up-to-date product profiles issued by the participating businesses, companies, services providers or the like, and may additionally maintain the product profiles. For example, the server computer 115 may store the product profiles such that the profiles may serve as an environment where data related to the product profiles may be created, edited, stored, and/or updated as part of the product profile.

The server computer 114 may additionally communicate with a regulation-related data source(s) 116 and a non-regulatory data source(s) 118. According to embodiments, the regulation-related data source(s) 116 may be associated with various regulatory bodies or agencies that may set or institute product regulation updates. For example, the regulation-related data source(s) 116 may be associated with the U.S. Consumer Product Safety Commission (CPSC), the U.S. Environmental Protection Agency (EPA), the U.S. Federal Aviation Administration (FAA), the U.S. Federal Communications Commission (FCC), the U.S. Food and Drug Administration (FDA), the U.S. Federal Trade Commission (FTC), the U.S. National Highway Traffic Safety Administration (NHTSA), the U.S. Nuclear Regulatory Commission (NRC). The regulatory bodies or agencies may be any combination of federal-level, state-level, municipal-level, local-level, foreign, or other level of regulatory bodies or agencies. Generally, when a regulatory body or agency issues a new or updated product regulation update, the corresponding regulation-related data source 116 may push or otherwise send the new or updated product regulation update to the server computer 115, or the server computer 115 may pull or retrieve the new or updated product regulation update from the corresponding regulation-related data source 116. Accordingly, the server computer 115 may store the most up-to-date product regulation updates issued by the participating regulatory bodies or agencies.

According to embodiments, the server computer 115 may employ various machine learning techniques, calculations, algorithms, and the like to generate and maintain a machine learning model associated with regulations and protocols for a set of products for a given market(s). The server computer 115 may initially train the machine learning model using a set of training data, or may not initially train the machine learning model. The server computer 115 may analyze any product profile information received from the electronic devices 101, 102, 103, 104 and/or the product-related data source(s) 117, for example using the machine learning model, to determine any regulations that may apply to the corresponding product(s). The server computer 115 may avail the result(s) of the analysis (e.g., by presenting the result(s) in a user interface) for review and further selection by a user of the server computer 115. These functionalities are further described with respect to FIG. 1B.

The server computer 115 may be configured to interface with or support a memory or storage 113 capable of storing various data, such as in one or more databases or other forms of storage. According to embodiments, the storage 113 may store data or information associated with any machine learning models that are generated by the server computer 115, any product regulation update information received from the regulation-related data sources 116, or any product profile information received from the electronic devices 101, 102, 103, 104 or from the product-related data source(s) 117. Additionally, the server computer 115 may store data associated with the review of regulation updates determined to potentially be applicable to products.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103, 104 interface with the server computer 115, the electronic devices 101, 102, 103, 104 may actually interface with one or more of a number of distributed computers, servers, machines, or the like, to facilitate the described functionalities.

Figure 1B:
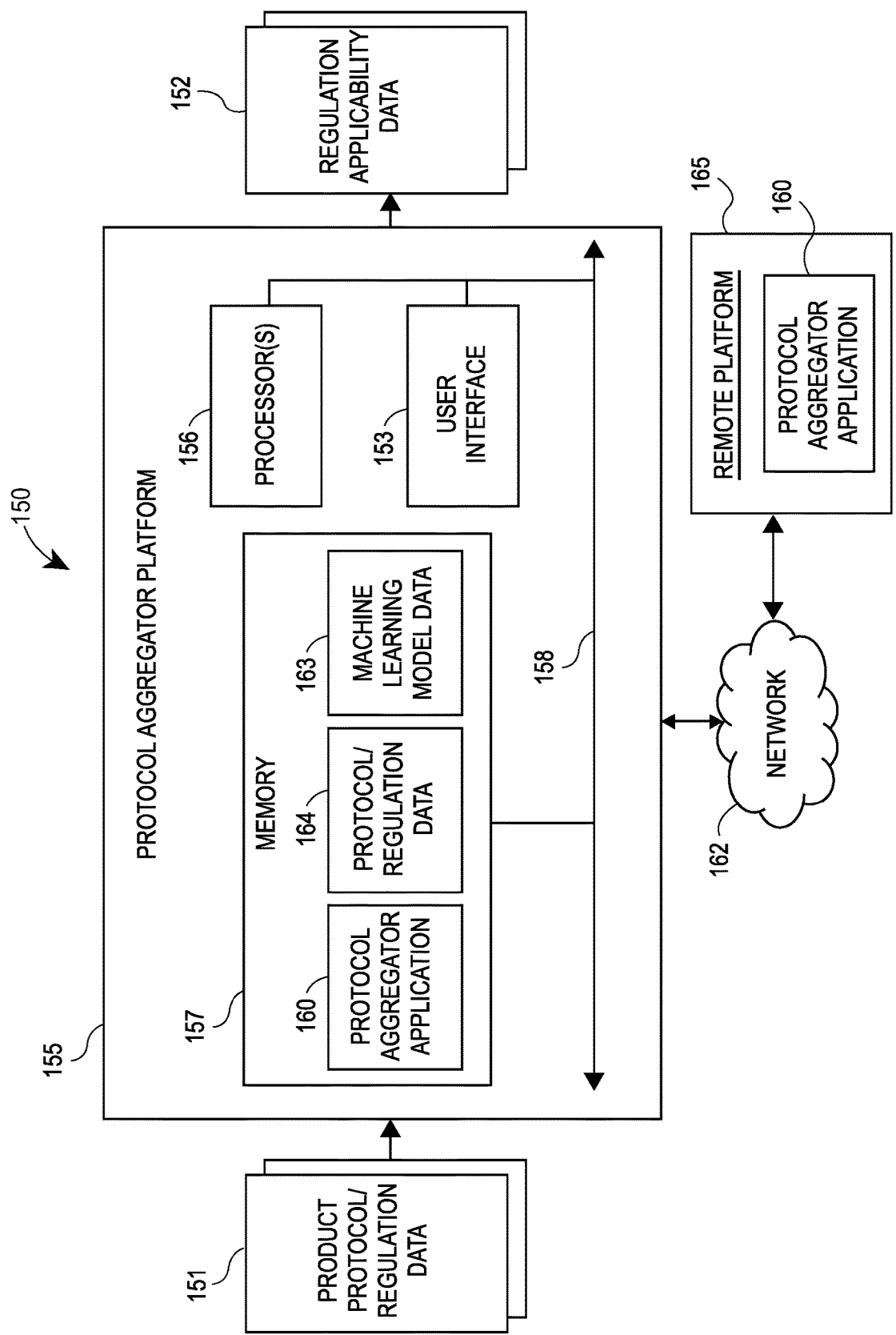
FIG. 1B depicts an overview of certain components configured to facilitate the systems and methods, in accordance with some embodiments.

Although four (4) electronic devices 101, 102, 103, 104, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B is an example environment 150 in which product regulation update data 151 is processed into regulation update applicability data 152 via a regulation update aggregation platform 155, according to embodiments. The regulation update aggregation platform 155 may be implemented on any computing device, including the server computer 115 (or in some implementations, one or more of the electronic devices 101, 102, 103, 104) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The regulation update aggregation platform 155 may further include a user interface 153 configured to present content (e.g., information associated with product profiles and potentially applicable product regulation updates). Additionally, a user may make selections to the content via the user interface 153, such as to navigate through different information, select and review applicable product regulation updates, select whether product regulation updates are applicable, and/or other actions. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a regulation update aggregator application 160), data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The regulation update aggregation platform 155 may operate in a networked environment and communicate with one or more remote platforms, such as a remote platform 165, via a network(s) 162, such as a local area network (LAN), a wide area network (WAN), telecommunications network, or other suitable network. The platform 165 may be implemented on any computing device, including one or more of the electronic devices 101, 102, 103, 104 or the server computer 115 as discussed with respect to FIG. 1A, and may include many or all of the elements described above with respect to the platform 155. In some embodiments, as will be described herein, the regulation update aggregator application 160 as will be further described herein may be stored and executed by the remote platform 165 instead of by or in addition to the platform 155.

The regulation update aggregation platform 155 may store, as profile and regulation data 164, any information associated with product profiles and product regulations, such as the received product regulation update data 151. Additionally, the regulation update aggregator application 160 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, latent semantic analysis, Bayesian networks, or the like. Generally, the regulation update aggregation platform 155 may support various supervised and/or unsupervised machine learning techniques. Additionally, the regulation update aggregation platform 155 may employ topic modeling and clustering of the profile and regulation data 164, which may enable the vast and diverse set of regulations to be narrowed to a more relevant set of regulations that may be applicable to the product and/or to a given market(s) for the product. In an embodiment, the regulation update aggregator application 160 may initially train a machine learning model with training data, and store the resulting machine learning model as machine learning model data 163. In another embodiment, the regulation update aggregator application 160 may generate and update the machine learning model, and the corresponding machine learning model data 163, based on the received product regulation update data 151, and in some cases may generate the machine learning model using various unsupervised training techniques, such as clustering or cluster analysis and could also take "guidance" information from subject matter experts (SME) which could augment the resulting data with qualifying metadata or contextual information.

For example, the regulation update aggregator application 160 may generate and update the machine learning model to include a semantic knowledge graph, included in the machine learning model data 163. The semantic knowledge graph may be a contextual model trained on and/or updated by an online and/or offline process that represents the interconnections between regulations and protocols, but training the semantic knowledge graph may also take place during the online functionality of the regulation update aggregator application 160. The regulation update aggregator application 160 may generate such a semantic knowledge graph by parsing protocol data (e.g., from the protocol and regulation data 164).

Initially, the protocol data may be in a non-standardized, customer-specific format, so the regulation update aggregator application 160 may standardize the protocol data during the parsing process to determine a number of schema. The dynamic schema may include, by way of non-limiting example, customer name, profile scope, regulation summaries, market of the profile, product category, test method details, profile creation date, profile revision data, and/or any other desirable identifying information. This training process may be repeated for the applicable regulations from the protocol and regulation data 164, and may be dynamically performed in its entirety as, for example, the regulation update aggregation platform 155 receives the product regulation update data 151.

According to embodiments, when the regulation update aggregation platform 155 receives the data 151, such as for a new or updated regulation, the regulation update aggregator application 160 may analyze the data 151 to determine what, if any, of the product regulation updates may apply to a product. In analyzing the data 151, the regulation update aggregator application 160 may use any combination of the protocol and regulation data 164 and the machine learning model data 163, including, for example, the semantic knowledge graph.

In an implementation, the regulation update aggregator application 160 may assign unique identifiers (IDs) to each schema stored in the machine learning model data 163. Once the regulation update aggregation platform 155 receives the product regulation update data 151, the regulation update aggregator application 160 parses the data 151 to produce a respective schema, and compares the respective schema to the schema stored in the machine learning model data 163. Based on the identified similarities, the regulation update aggregator application 160 may determine which of the product regulation updates may apply to the product, as well as a respective confidence level of the applicability for each identified product regulation update. In this way, the user can identify exactly what areas of the product regulation are undergoing change, and how the user may desire to change the associated product profiles accordingly.

In another implementation, the regulation update aggregator application 160 may parse the language of the product profile and compare the content of the product regulation updates to identify similarities. The level of similarity between the product profile and the product regulation updates may be modified so as to adjust the sensitivity of the analysis. Based on the identified similarities, the regulation update aggregator application 160 may determine which of the product regulation updates may apply to the product, as well as a respective confidence level of the applicability for each identified product regulation update.

In another implementation, the regulation update aggregator application 160 may generate an embedding or any other representation based on the content of the product profile, where the regulation update aggregator application 160 may analyze the embedding or any other representation in combination with the machine learning model data 163 to determine which of the product regulation updates may apply to the product, as well as a respective confidence level for each identified product regulation update. The results of any analyses by the regulation update aggregator application 160 may be embodied as the regulation update applicability data 152.

As an example, a product profile for a mattress may describe the dimensions and materials of the mattress, as well as various other regulatory requirements and beneficial voluntary requirements of the mattress. However, the product profile may not mention anything about the fire retardant capability of the mattress and/or its materials. In certain jurisdictions or areas, mattresses are required to comply with certain flame retardant regulations. When the regulation update aggregator application 160 analyzes the product profile for the mattress, the regulation update aggregator application 160 may not only identify product regulation updates that may be applicable to the mattress itself, but also product regulation updates that may be applicable to flame retardant capabilities of the mattress. In particular, the regulation update aggregator application 160 may determine that the mattress includes a foam material, and may determine, from the protocol and regulation data 164, that mattresses having a foam material may be subject to a certain flame retardant regulation. Accordingly, the regulation update aggregator application 160 may present the certain flame retardant regulation update for user review even though the product profile does not mention any flame retardant capabilities and even though the entity associated with the mattress may not know that the mattress is subject to flame retardant regulations.

After identifying potentially applicable product regulation updates for a product based on the product profile, the regulation update aggregator application 160 may add, to the machine learning model, the results from the analysis so that the regulation update aggregator application 160 may use the updated machine learning model in subsequent regulation update applicability determinations. In embodiments, results from an internal or manual review of the regulation update applicability analysis may additionally or alternatively be used to update the machine learning model.

The regulation update aggregator application 160 (or another component) may cause the regulation update applicability data 152 (and, in some cases, the originally-received data 151) to be displayed on the user interface 153 for review by the user of the regulation update aggregation platform 155. The user may select to review and/or modify the displayed data. For instance, a user may review a product profile in comparison to the potentially applicable product regulation updates, and select which of the product regulation updates are actually applicable, which may be to contextualize to a vision of the target marketplace, market segment, or audience. For instance, if a product profile is associated with a launch of a set of headphones in the United States, and the potentially applicable product regulation updates include a noise output regulation applicable to the United States and a comparable regulation applicable to China, the user may select the United States regulation as applicable and the China regulation as not applicable. The regulation update aggregator application 160 may update the data model stored in the machine learning model data 163 to reflect any selections made by the user, for subsequent use by the regulation update aggregator application 160.

In general, a computer program product in accordance with an embodiment may include a computer usable storage medium (e.g., standard random access memory (RAM), an optical disc, a universal serial bus (USB) drive, a big data processing engine, a NoSQL repository, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources. Generally, each of the data 151 and the data 152 may be embodied as any type of electronic document, file, template, etc., that may include various textual content and, for the data 152, an identification of the potentially applicable product regulation updates for a given product, and may be stored in memory as program data in a hard disk drive, magnetic disk and/or optical disk drive in the regulation update aggregation platform 155 and/or the remote platform 165.

FIGS. 2A-2D and 3A-3F depict example interfaces associated with the systems and methods. In embodiments, the interfaces may be displayed by a computing device in a user interface, such as the user interface 153 as discussed with respect to FIG. 1B. Additionally, the interfaces may be accessed and reviewed by a user of the platform (e.g., the platform 155), where the user may make selections, submit entries or modifications, or facilitate other functionalities.

FIG. 2A depicts an interface 200 associated with the systems and methods. In particular, the interface 200 depicts a set of regulations 201 having recent updates (as shown: Appliance Efficiency Regulations of California, Radio Act Enforcement Regulations of Japan, and Energy Efficiency Labeling of Household Frost Free Refrigerators, Regulations of India). Each of the set of regulations 201 has an effective date (i.e., when the regulation itself became effective), an alert date (i.e., when the regulation update alert was received), and a most recently updated date (i.e., when the regulation was last updated).

The interface 200 further indicates a set of product categories 202 (as shown: general use headphones, consumer power refrigerators, consumer hair dryers, wireless devices, and TV antennas) and a set of requirements 203 (as shown: general consumer electronics in the United States, consumer hair clippers in the United States, consumer hair dryers in India, Christmas lights in the United States, and headphones in China) for which the largest amount of potentially applicable regulatory updates have been surfaced. The interface 200 also provides an overview of the most recently added potential regulatory impacts to the set of regulations 201. Additionally, the interface 200 includes a chart 204 identifying the count of rated impacts and non-rated impacts (e.g., impacts that have been independently verified).

The interface 200 enables a user to select to view additional regulations, in which case the computing device may display an interface 210 as depicted in FIG. 2B. The interface 210 enables the user to select various filters, including a date range 211, an applicable country 212 (i.e., view regulation updates specific to specific countries), and a type(s) of products covered by the regulations 213. Additionally, the interface 210 enables the user to sort by an alert date 214.

The interface 200 further enables the user to select specific regulatory updates of the set of regulations 201 to review additional information. For example, the user may select the Appliance Efficiency Regulation 205, in which case the computing device may display an interface 220 as depicted in FIG. 2C. The interface 220 may include a summary 221 of the selected regulation and a selection 222 to view the source of the regulation or update. Additionally, the interface 220 may include a set of profiles 223, each of which is impacted by or potentially impacted by the selected regulatory update.

One of the set of profiles 223 may be a profile 224 for audio visual cables. The user may select the profile 224, in which case the computing device may display an interface 230 as depicted in FIG. 2D. The interface 230 may including various information identifying and describing the profile. Additionally, the interface 230 may indicate the Appliance Efficiency Regulation 205 which may be applicable to the profile 224, and may enable the user to select whether the Appliance Efficiency Regulation 205 is actually applicable to the profile 224. For example, the interface 230 may include a star rating system 231 where the user may select one (1) star if the profile 224 is not impacted by the regulation 205 and three (3) stars if the profile 224 is impacted by the regulation 205. The computing device may associate, in memory, the selected rating with the regulation 205 and with the profile 224. The user may select and rate the regulation applicability of any of the remaining protocols in the set of profiles 223 depicted in FIG. 2C.

Figure 3A:
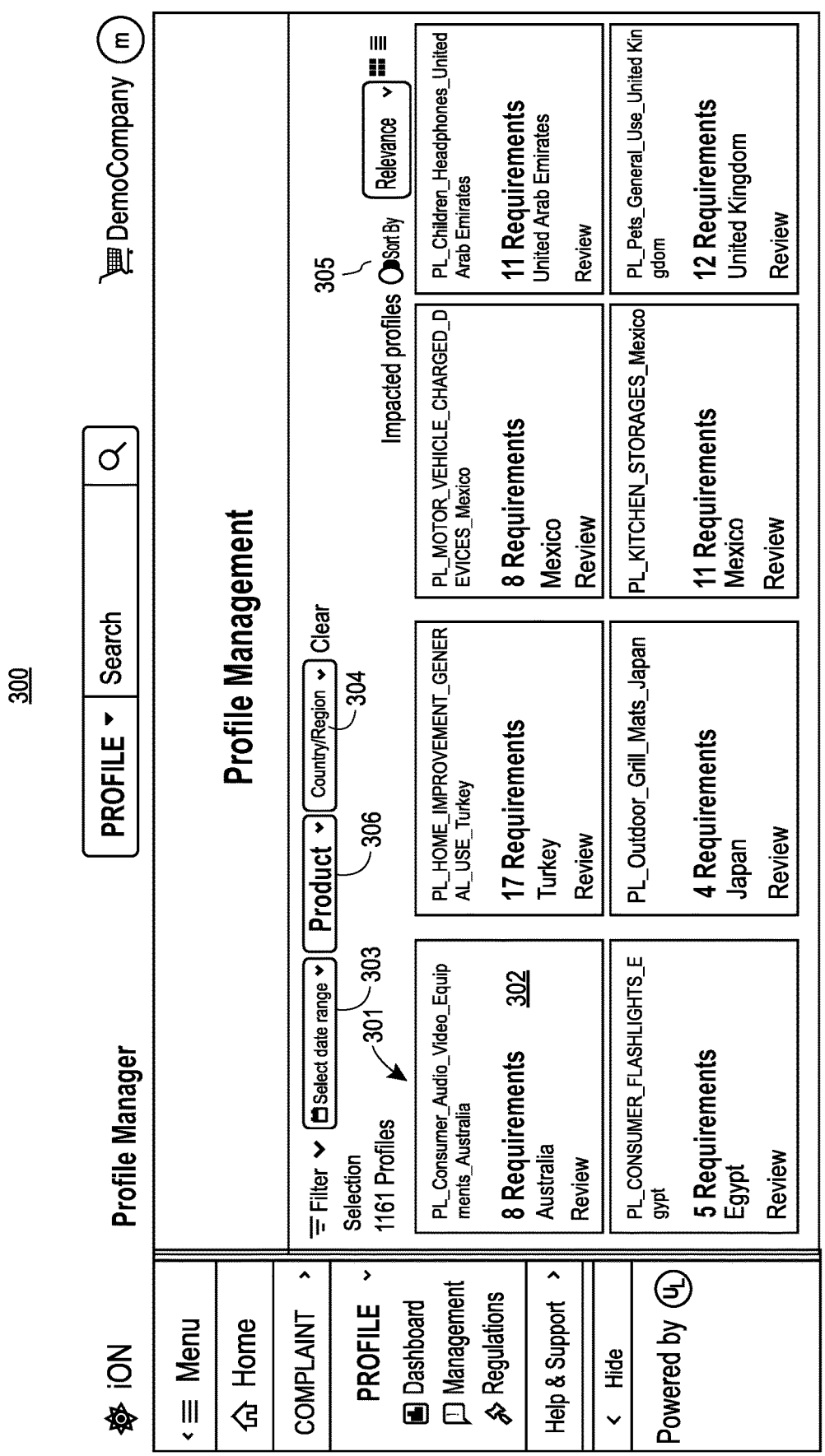

FIG. 3A depicts an interface 300 associated with the "Management" feature of the regulation update aggregation platform 155. The interface 300 may include a set of profiles 301 that a user may select to review and assess regulation update applicability, among other actions. The interface 300 enables the user to select various filters for the set of profiles 301, including a date range 303, an applicable country or region (i.e., view profiles specific to specific countries/regions) 304, and a type(s) of products covered by the profiles 306. As an example, the user may select to review a profile 302 associated with consumer audio and video equipment in Australia, in which case the computing device may display an interface 310 as depicted in FIG. 3B.

Figure 3B:
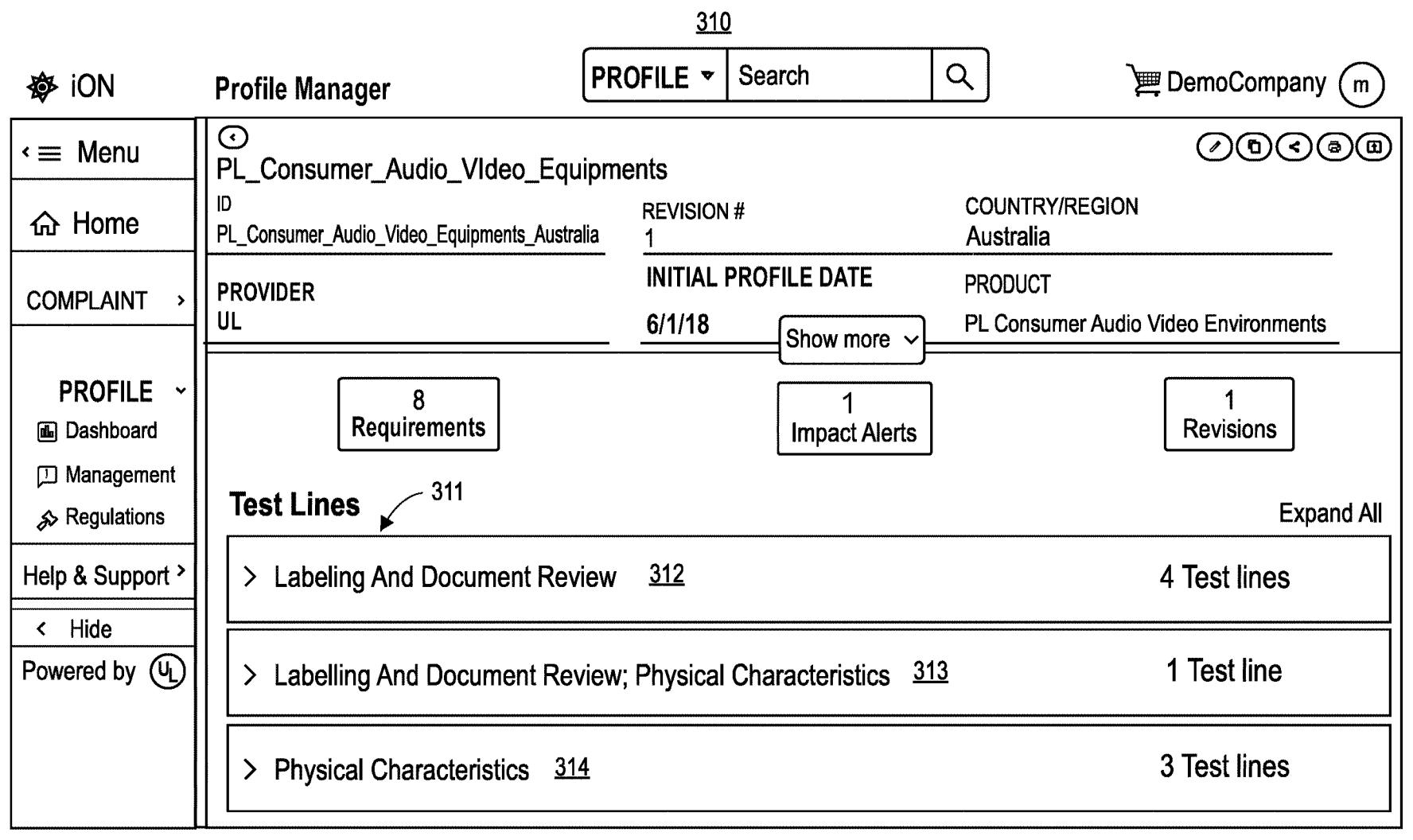

The interface 310 of FIG. 3B identifies a set of requirement categories 311 (as shown: labeling and document review 312, physical characteristics of labeling and document review 313, and physical characteristics 314) for a set of requirements for various regulations, standards, and/or customer requirements. In response to the user selecting the labeling and document review 312 category, the computing device may display an interface 320 as depicted in FIG. 3C.

Figure 3C:
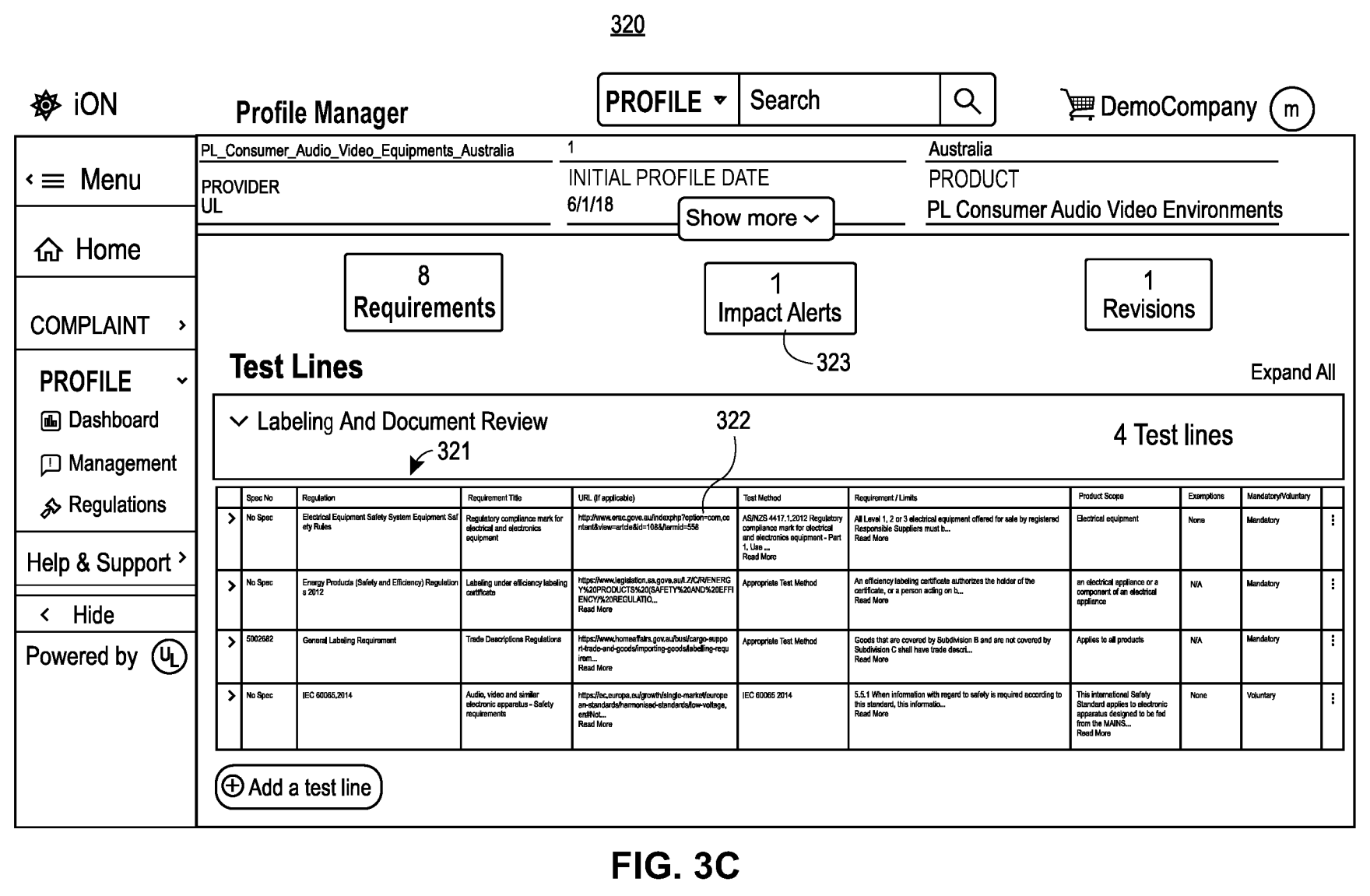

The interface 320 of FIG. 3C identifies a set of regulations 321 that are deemed applicable to the labeling and document review 312 category. The user may make various selections in the interface 320 to review certain information. For example, the user may select a URL 322 of the Electrical Equipment Safety System Equipment Safety Rules of Australia to review the content of that regulation. The interface 320 further includes an impact alerts selection 323 that enables the user to select an applicability of a set of regulations that are not yet deemed applicable to the selected profile. In the interface 320 depicted in FIG. 3C, there are not any regulations for which an applicability determination is needed.

Figure 3D:

The interface 300 of FIG. 3A may further include a selection 305 to filter impacted profiles, where in response to a user selecting the selection 305, the computing device may display an interface 330 as depicted in FIG. 3D. The interface 330 may identify a set of profiles 331 that are potentially impacted by certain regulations (or updates to the regulations). The user may select a profile 332 related to consumer hair clippers in the United States. In response, the computing device may display an interface 340 as depicted in FIG. 3E.

The interface 340 may identify a regulatory update 341 (the Consumer Product Safety Act) that was recently updated and that may apply to the consumer hair clipper profile 332. The user may select whether the regulatory update 341 applies to the consumer hair clipper profile 332 by using a star rating system 342, as discussed with respect to FIG. 2D. After the user selects a rating in the star rating system 342, the computing device may associate (or not associate) the regulatory update 341 with the consumer hair clipper profile 332.

The interface 350 of FIG. 3F identifies a set of potentially applicable product regulation updates 351 and the corresponding potentially applicable product profiles 352. The interface 350 also features relevance scores 353 and product profile identifiers (IDs) 354 associated with each potentially applicable product regulation update 351. For example, and as referenced further herein, the application (e.g., regulation update aggregator application 160) may parse received data to determine a confidence level with respect to the applicability of any regulation update to a particular product profile. The interface 350 may display this confidence level in the form of a numeric score (as shown, in reference to 353), a percentage, a confidence percentile, or any other suitable metric that the user may choose. Moreover, the interface 350 provides the corresponding profile IDs 354, which correspond to the product profiles 352. Using this information, the user may analyze the correlations made by the system to confirm or deny their applicability.

Accordingly, the system (e.g., regulation update aggregation platform 155) may update the analysis technique (e.g., semantic knowledge graph) to reflect the correct/incorrect association. For example, the system draws a correlation between a product profile and a regulation update due to a specific association of words relating to telecommunications equipment. However, the system categorizes it as a weak correlation (e.g., a low relevance score 353) because the telecommunication terminology used in both the profile and regulation update are the only shared terms. When a user confirms the applicability of the regulation update to the product profile, the system updates the semantic knowledge graph to more heavily weigh the inclusion of such telecommunication terminology in future analyses. In other words, the system may draw stronger correlations between a regulation update and product profile in future analyses when both the update and profile contain those specific telecommunication terms.

Figure 4:
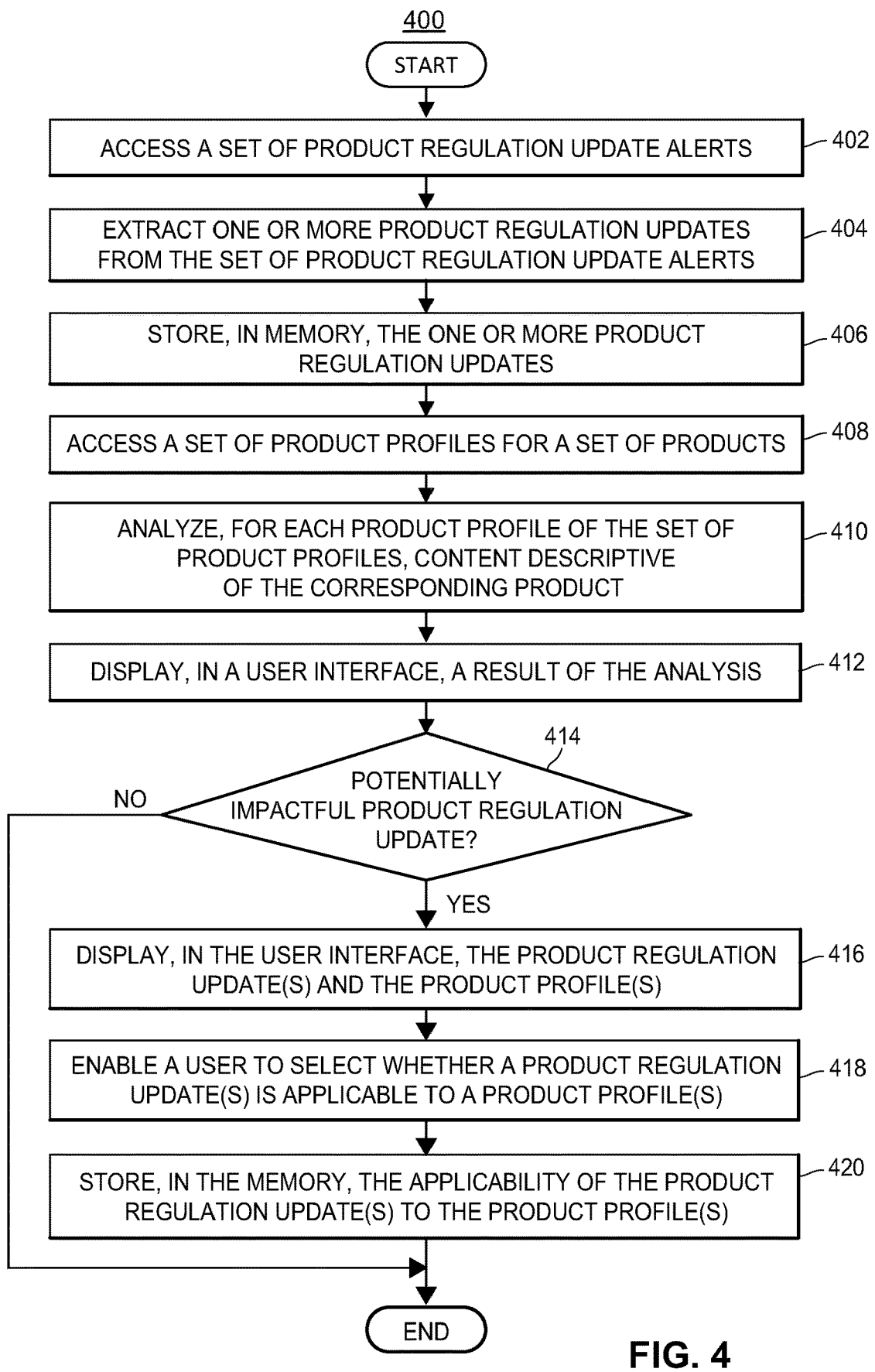
FIG. 4 is an example flowchart associated with dynamically determining applicable product regulation updates, in accordance with some embodiments.

FIG. 4 depicts is a block diagram of an example method 400 for dynamically determining product regulation updates that are applicable to product profiles. The method 400 may be facilitated by an electronic device (such as the server computer 115 or components associated with the regulation update aggregation platform 155 as discussed with respect to FIGS. 1A and 1B) that may be in communication with additional devices and/or data sources.

The method 400 may begin when the electronic device accesses (block 402) a set of product regulation update alerts. In embodiments, the electronic device may receive the set of product regulation update alerts as product regulation updates from one or more sources (e.g., the regulation-related data source(s) 116 as discussed with respect to FIG. 1A).

The electronic device may extract (block 404) one or more product regulation updates from the set of product regulation update alerts. In embodiments, the electronic device may extract the one or more product regulation updates by parsing the one or more product regulation update alerts.

The electronic device may store (block 406), in memory, the set of product regulation updates. In embodiments, the electronic device may store the set of product regulation updates in the memory as part of a machine learning model. The electronic device may access (block 408) a set of product profiles for a set of products for a given market(s). In embodiments, the electronic device may receive the set of product profiles associated with new or existing products from one or more sources (e.g., the product-related data source(s) 117 as discussed with respect to FIG. 1A). Further, each product profile of the set of product profiles may include content descriptive of a corresponding product of the set of products for a given market(s).

The electronic device may analyze (block 410), for each product profile of the set of product profiles, the content descriptive of the corresponding product. In analyzing each product profile, the electronic device may analyze the content using the stored machine learning model built from the set of product regulations. The electronic device may display (block 412), in a user interface, a result of the analysis. In embodiments, the electronic device may display, in the user interface, indications of any of the product profiles and/or the product regulation updates.

In analyzing the content descriptive of the corresponding product, the electronic device may determine (block 414), for each product profile, whether there is a product regulation update(s) that is potentially applicable. If there are no potentially applicable product regulation updates ("NO"), processing may end or proceed to other functionality. If there is a potentially applicable product regulation update(s) ("YES"), processing may proceed to block 416.

At block 416, the electronic device may display, in the user interface, a list of product regulation update(s) and the product profile(s), such as any product regulation update(s) that is potentially relevant to the corresponding product profile(s). In embodiments, the electronic device may receive, via the user interface, a selection to view each product profile having at least one product regulation update that is potentially applicable, and the electronic device may display information associated with the selected product profile(s) and the potentially applicable product regulation update(s). In one scenario, the electronic device may display, in the user interface, a set of requirements or summaries associated with a selected product profile, and for each line item of the set of requirements or summaries, at least one product regulation update that is applicable to the line item.

In embodiments, the electronic device may transmit the information associated with the selected product profile(s) and the potentially applicable product regulation update(s) to additional connected systems. For example, the electronic device may transmit the information to external/internal servers, workstations, and/or any other suitable receiving device. In these embodiments, the transmitted information may be stored and/or used for design and development applications. Thus, once the data is transmitted, the systems receiving the information may be updated to incorporate the information in future analytics processes.

The electronic device may enable (block 418) a user to select whether a product regulation update(s) is applicable to a product profile(s). Based on the selection of block 418, the electronic device may store (block 420), in the memory, the applicability of the product regulation update(s) to the product profile(s). Accordingly, the electronic device may use the updated machine learning model that reflects accurate regulation applicability in subsequent analyses.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for dynamically determining impacts of product regulation updates on product profiles, the method comprising:
    accessing, by a processor, a set of product regulation update alerts;
    extracting, by the processor, a set of product regulation updates from the set of product regulation update alerts;
    storing, in memory as part of a machine learning model, the set of product regulation updates;
    accessing, by the processor, a set of product profiles associated with a set of products, wherein each product profile of the set of product profiles comprises content descriptive of a corresponding product of the set of products;
    analyzing, by the processor, for each product profile of the set of product profiles using a latent semantic analysis technique and a semantic knowledge graph in association with the machine learning model, the content descriptive of the corresponding product to determine whether at least one product regulation update of the set of product regulation updates is potentially applicable to the product profile;
    displaying, in a user interface, a result of the analyzing;
    receiving, via the user interface, a user response indicating whether the at least one product regulation update is applicable to the product profile; and
    updating, by the processor, the semantic knowledge graph based on the user response.

2. The computer-implemented method of claim 1, wherein displaying the result of the analyzing comprises:
    displaying, in the user interface for each product profile having the at least one product regulation update that is potentially applicable, (i) an indication of the at least one product regulation update, and (ii) an indication of the product profile.

3. The computer-implemented method of claim 2, wherein displaying (i) the indication of the at least one product regulation update, and (ii) the indication of the product profile comprises:
    receiving, via the user interface, a selection to view each product profile having the at least one product regulation update that is potentially applicable; and
    in response to receiving the selection, displaying, in the user interface for each product profile having the at least one product regulation update that is potentially applicable, (i) the indication of the at least one product regulation update, and (ii) the indication of the product profile.

4. The computer-implemented method of claim 1, further comprising:
    enabling a user to select, via the user interface for each product profile having the at least one product regulation update that is potentially applicable, whether the at least one product regulation update is applicable to the product profile.

5. The computer-implemented method of claim 4, further comprising:
    storing, in the memory based on the enabling the user to select whether the at least one product regulation update is applicable to the product profile, the set of product profiles to reflect applicability to the set of product regulation updates.

6. The computer-implemented method of claim 1, further comprising:
    receiving, via the user interface, a selection to review a product profile of the set of product profiles; and
    displaying, in the user interface, (i) a set of requirements associated with the product profile, and (ii) for each requirement of the set of requirements, at least one product regulation update of the set of product regulation updates that is applicable to the requirement.

7. A system for dynamically determining impacts of product regulation updates on product profiles, the system comprising:
    a memory storing instructions;
    a user interface; and
    a processor interfaced with the memory and the user interface, and configured to execute the instructions to cause the processor to:
        access a set of product regulation update alerts,
        extract a set of product regulation updates from the set of product regulation update alerts,
        cause the memory to store the set of product regulation updates as part of a machine learning model,
        access a set of product profiles associated with a set of products, wherein each product profile of the set of product profiles comprises content descriptive of a corresponding product of the set of products,
        analyze, for each product profile of the set of product profiles using a latent semantic analysis technique and a semantic knowledge graph in association with the machine learning model, the content descriptive of the corresponding product to determine whether at least one product regulation update of the set of product regulation updates is potentially applicable to the product profile,
        cause the user interface to display a result of the analyzing,
        receive, via the user interface, a user response indicating whether the at least one product regulation update is applicable to the product profile, and update the semantic knowledge graph based on the user response.

8. The system of claim 7, wherein the processor causes the user interface to display, for each product profile having the at least one product regulation update that is potentially applicable, (i) an indication of the at least one product regulation update, and (ii) an indication of the product profile.

9. The system of claim 7, wherein the processor causes the user interface to display, for each product profile having the at least one product regulation update that is potentially applicable, (i) the indication of the at least one product regulation update, and (ii) the indication of the product profile in response to receiving, via the user interface, a selection to view each product profile having the at least one product regulation update that is potentially applicable.

10. The system of claim 7, wherein the processor is configured to execute the instructions to further cause the processor to:
enable a user to select, via the user interface for each product profile having the at least one product regulation update that is potentially applicable, whether the at least one product regulation update is applicable to the product profile.

11. The system of claim 10, wherein the processor is configured to execute the instructions to further cause the processor to:
based on the enabling the user to select whether the at least one product regulation update is applicable to the product profile, cause the memory to store the set of product profiles to reflect applicability to the set of product regulation updates.

12. The system of claim 7, wherein the processor is configured to execute the instructions to further cause the processor to:
receive, via the user interface, a selection to review a product profile of the set of product profiles, and
cause the user interface to display (i) a set of requirements associated with the product profile, and (ii) for each requirement of the set of requirements, at least one product regulation update of the set of product regulation updates that is applicable to the requirement.

13. A non-transitory computer-readable storage medium having stored thereon a set of instructions, executable by a processor, for dynamically determining impacts of product regulation updates on product profiles, the instructions comprising:
instructions for accessing a set of product regulation update alerts;
instructions for extracting a set of product regulation updates from the set of product regulation update alerts;
instructions for storing, in memory as part of a machine learning model, the set of product regulation updates;
instructions for accessing a set of product profiles associated with a set of products, wherein each product profile of the set of product profiles comprises content descriptive of a corresponding product of the set of products;
instructions for analyzing, for each product profile of the set of product profiles using a latent semantic analysis technique and a semantic knowledge graph in association with the machine learning model, the content descriptive of the corresponding product to determine whether at least one product regulation update of the set of product regulation updates is potentially applicable to the product profile;
instructions for displaying, in a user interface, a result of the analyzing;
instructions for receiving, via the user interface, a user response indicating whether the at least one product regulation update is applicable to the product profile; and
instructions for updating the semantic knowledge graph based on the user response.

14. The non-transitory computer-readable storage medium of claim 13, wherein the instructions for displaying the result of the analyzing comprise:
instructions for displaying, in the user interface for each product profile having the at least one product regulation update that is potentially applicable, (i) an indication of the at least one product regulation update, and (ii) an indication of the product profile.

15. The non-transitory computer-readable storage medium of claim 14, wherein the instructions for displaying (i) the indication of the at least one product regulation update, and (ii) the indication of the product profile comprise:
instructions for receiving, via the user interface, a selection to view each product profile having the at least one product regulation update that is potentially applicable; and
instructions for, in response to receiving the selection, displaying, in the user interface for each product profile having the at least one product regulation update that is potentially applicable, (i) the indication of the at least one product regulation update, and (ii) the indication of the product profile.

16. The non-transitory computer-readable storage medium of claim 13, wherein the instructions further comprise:
instructions for enabling a user to select, via the user interface for each product profile having the at least one product regulation update that is potentially applicable, whether the at least one product regulation update is applicable to the product profile.

17. The non-transitory computer-readable storage medium of claim 16, wherein the instructions further comprise:
instructions for storing, in the memory based on the enabling the user to select whether the at least one product regulation update is applicable to the product profile, the set of product profiles to reflect applicability to the set of product regulation updates.

* * * * *